(12) United States Patent
Chauvin et al.

(10) Patent No.: US 8,213,051 B2
(45) Date of Patent: Jul. 3, 2012

(54) COLOR MANAGEMENT WORKFLOW FOR TRANSITIONING OFFSET PRINTING USING CUSTOM INKS TO DIGITAL PRINTING

(75) Inventors: James Chauvin, Frederick, CO (US); Hong Li, Superior, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 495 days.

(21) Appl. No.: 12/504,446

(22) Filed: Jul. 16, 2009

(65) Prior Publication Data

US 2011/0013207 A1 Jan. 20, 2011

(51) Int. Cl.
*G06F 15/00* (2006.01)
*H04N 1/40* (2006.01)
*G06K 9/00* (2006.01)

(52) U.S. Cl. .......................... 358/1.9; 358/2.1; 382/167

(58) Field of Classification Search ........................ None
See application file for complete search history.

(56) References Cited

U.S. PATENT DOCUMENTS

| | | | |
|---|---|---|---|
| 6,281,984 B1 | 8/2001 | Decker et al. | |
| 6,396,595 B1* | 5/2002 | Shimazaki | 358/1.9 |
| 6,618,499 B1* | 9/2003 | Kohler et al. | 382/162 |
| 6,792,864 B2 | 9/2004 | Piatt et al. | |
| 7,612,926 B2* | 11/2009 | Jodra et al. | 358/518 |
| 2003/0081229 A1* | 5/2003 | Underwood et al. | 358/1.9 |
| 2007/0139671 A1 | 6/2007 | Stevens | |
| 2007/0188782 A1 | 8/2007 | Sakurai | |
| 2007/0285694 A1 | 12/2007 | Horita | |
| 2008/0068663 A1 | 3/2008 | Broddin et al. | |

* cited by examiner

*Primary Examiner* — Twyler Haskins
*Assistant Examiner* — Barbara Reinier
(74) *Attorney, Agent, or Firm* — Blakely, Sokoloff, Taylor & Zafman LLP

(57) ABSTRACT

A color management workflow for offset printing using custom inks is disclosed. In one embodiment, an apparatus for color management workflow for transitioning offset printing using custom inks to digital printing includes a color image recording device to measure one or more spot color ramps that correspond to custom ink colors, the color image device operable to determine a matching L*a*b value for the spot color ramps. The apparatus further includes a color characterization module to determine device CMYK matches for each of the L*a*b values for the one or more spot color ramps and create a custom input characterization file based on the device CMYK matches and an International Color Consortium (ICC) profile module to create a new input ICC file and a new output ICC file from the custom input characterization file.

17 Claims, 4 Drawing Sheets

300

Print spot color ramps (e.g., at 5, 10, 15, ..., 100% spread) for each custom ink color on the offset press used for the custom inks
310

Measure each spot color ramp sample using a color image recording device
320

Determine device CMYK matches for each of the measured spot color samples
330

Create a custom input characterization file is based on the determined CMYK matches
340

Add additional characterization data for different hue angles to the custom input characterization file
350

Create new input ICC and output ICC files from the custom input characterization file
360

Figure 3

COLOR MANAGEMENT WORKFLOW FOR TRANSITIONING OFFSET PRINTING USING CUSTOM INKS TO DIGITAL PRINTING

FIELD OF THE INVENTION

This invention relates generally to the field of printing systems. More particularly, the invention relates to a color management workflow for transitioning offset printing using custom inks to digital printing.

BACKGROUND

Growth in color management has resulted in an increase in software packages that are used to generate International Color Consortium (ICC) profiles. ICC profiles describe color attributes of a particular device or viewing requirement by defining a mapping between a source or target color space and a Profile Connection Space (PCS), such as either CIELAB (L*a*b*) or CIEXYZ.

Offset print customers often use custom blended inks for their printing instead of ICC-based digital printing. Moving these customers to an ICC-based digital printing solution is difficult because of the mapping required for their custom inks. If these custom inks have no standard input color space, then mapping to the ICC PCS is difficult. Often times a device CMYK path is the only option. However, this can come at the cost of color accuracy. For example, it may be possible to find the device CMYK match for a given solid (100% coverage). However, this relationship between CMYK % might not hold true for lighter tone levels of the custom ink causing incorrect colors in the resultant output.

Therefore, what is desired is a color management workflow for effectively mapping custom blended inks from offset printing to the ICC PCS for use in ICC-based digital printing.

SUMMARY

In one embodiment, a color management workflow for transitioning offset printing using custom inks to digital printing is disclosed. An apparatus for a color management workflow for transitioning offset printing using custom inks to digital printing includes a color image recording device to measure one or more spot color ramps that correspond to custom ink colors, the color image device operable to determine a matching L*a*b value for the spot color ramps. The apparatus further includes a color characterization module to determine device CMYK matches for each of the L*a*b values for the one or more spot color ramps and create a custom input characterization file based on the device CMYK matches and an International Color Consortium (ICC) profile module to create a new input ICC file and a new output ICC file from the custom input characterization file.

In another embodiment, a method for color management workflow for transitioning offset printing using custom inks to digital printing is disclosed. The method includes measuring one or more spot color ramps that correspond to custom ink colors, the color image device operable to determine a matching L*a*b value for the spot color ramps, determining device CMYK matches for each of the L*a*b values for the one or more spot color ramps, creating a custom input characterization file based on the device CMYK matches, and generating a new input ICC file and a new output ICC file from the custom input characterization file.

BRIEF DESCRIPTION OF THE DRAWINGS

A better understanding of the present invention can be obtained from the following detailed description in conjunction with the following drawings, in which:

FIG. 3 is a flow diagram illustrating one embodiment of a process for color management workflow for offset printing using custom inks.

DETAILED DESCRIPTION

A color management workflow for transitioning offset printing using custom inks to digital printing is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention disclose a color management workflow for transitioning offset printing using custom inks to digital printing. The color management workflow of embodiments of the invention transfers jobs from an offset printing press to a digital printer by mapping custom inks used in the printing press to the International Color Consortium (ICC) Profile Connection Space (PCS) PCS for use in an ICC workflow. Custom ink data is used to create ramps for each custom color. This ramp data is, in turn, used in combination with other characterization data to generate an input ICC profile for a digital printer in order to generate an output via the digital printer that is corrected for color differences.

Figure 1:
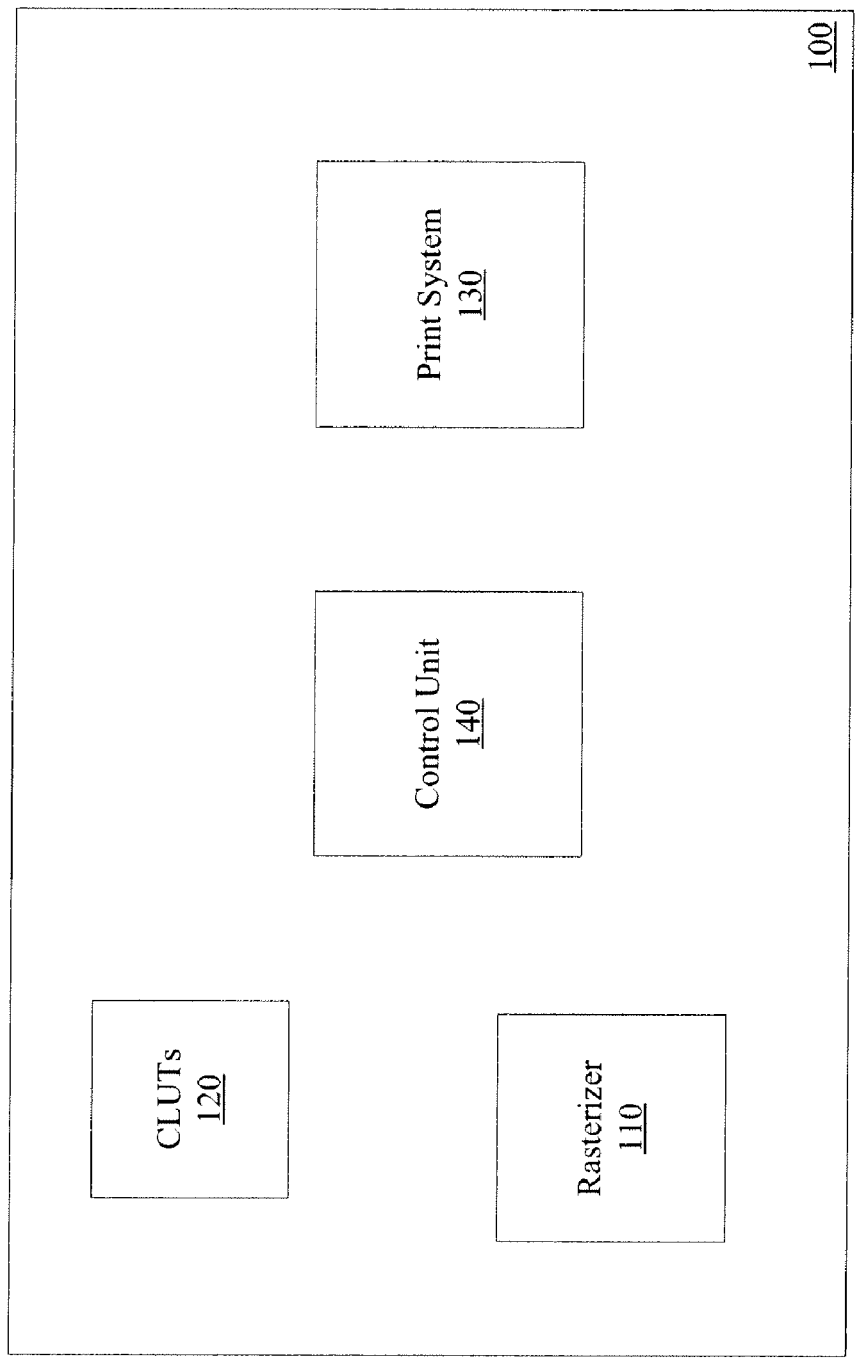
FIG. 1 illustrates one embodiment of a printer.

FIG. 1 illustrates one embodiment of a printer 100. Printer 100 includes a rasterizer 110 that is implemented to convert vector information received at printer 100 into a raster format. Particularly, rasterizer 110 generates a raster scan of a received image that is to be stored as scan line data in a memory array (not shown).

Printer 100 also includes color lookup tables (CLUTs) 120. CLUTs 120 support ICC profiles used in printer 100 to enable the use of different color transforms, where each transform is tailored for a different effect. According to one embodiment, each profile includes up to 6 CLUT's, three for input (AtoB tables, which convert from device space to PCS, and three for output (BtoA tables, that convert from PCS to device space). Printer 100 includes a print system 130 that physically applies print job data on a print medium. Control unit 140 is also included with in printer 100 to control the operation of print system 130.

Figure 2:
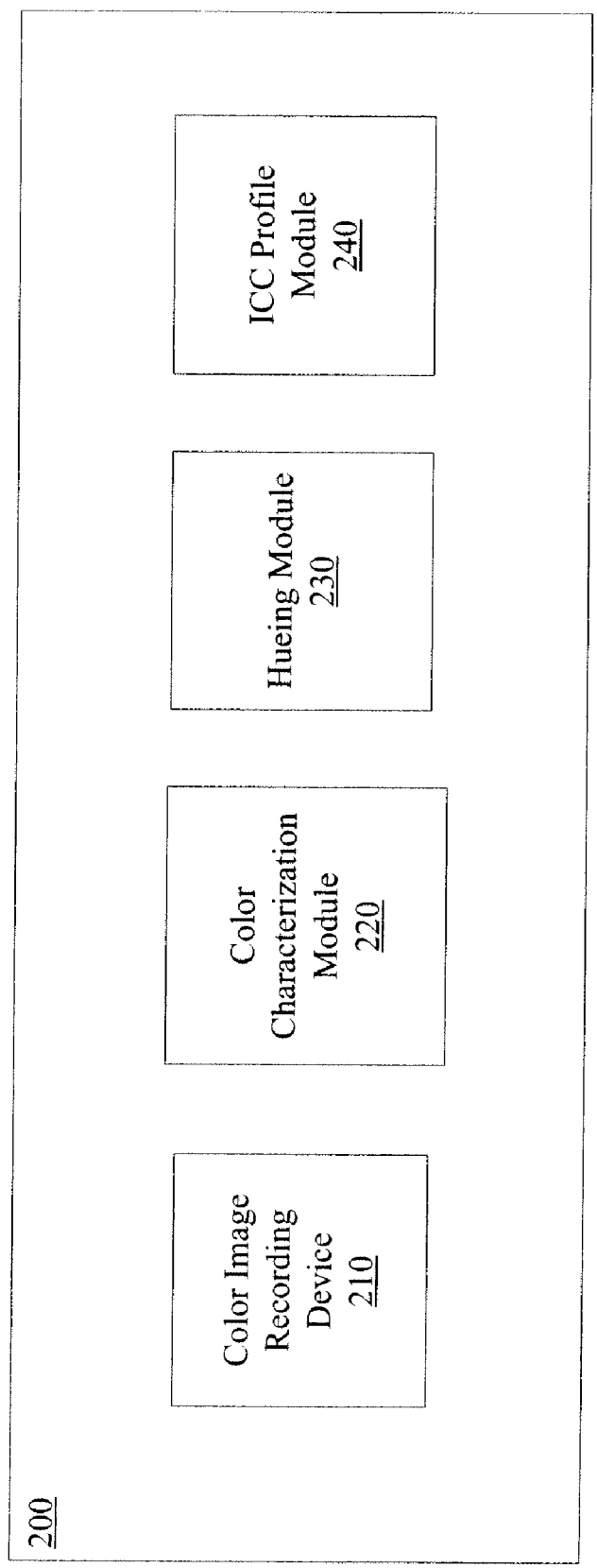
FIG. 2 illustrates a block diagram of a color image characterization device according to one embodiment of the invention.

FIG. 2 is a block diagram of a color image characterization device 200 according to one embodiment of the invention. In one embodiment, color image characterization device 200 may reside as a component of printer 100 described with respect to FIG. 1. In another embodiment, color image characterization device may be an independent device that is communicably coupled to printer 100. In one embodiment, color image characterization device 200 creates and inputs an ICC profile for custom-blended inks that were used in offset printing into CLUT 120 of printer 100, described with respect to FIG. 1. Color image characterization device 200 includes a color image recording device 210, a color characterization module 220, hueing module 230, and ICC profile module 240.

In one embodiment, color image recording device 210 may be implemented with a scanner, photo spectrophotometer, or any other type of imaging measurement device. For each custom-blended ink to be transferred from offset printing to digital printing, color image recording device 210 measures the custom color ink to determine an associated L*a*b value the custom ink. In one embodiment, spot color ramps (e.g., at 5, 10, 15 . . . 100% spread of the custom ink color) are printed for each of the custom inks by the offset press (or printer) that previously utilized the custom inks. These spot color ramps are inputted to the color image recording device 210 for measurement and determination of a matching L*a*b value. The measurement results from the color image recording device 210 are then handed off to the color characterization module 220.

Color characterization module 220 creates a custom input characterization file from the measurement results received from the color image recording device 210. The color characterization module 220 determines a CMYK value that matches each of the L*a*b values determined by the color image recording device 210 for each color ramp sample of each custom ink.

In addition, in one embodiment, the color characterization module 220 linearly scales the CMYK values in the custom input characterization file so that the scaling of the CMYK values matches a linear scaling of the custom color that the was originally provided to the color image characterization device. For example, with custom-blended inks on offset printers, the customer is able to scale a custom ink color at various percentages (e.g., 5%, 50%, 70%, etc.). The custom ink will always have the same dominant hue at any scale, such as at 5% or 100% scale. However, with CMYK colors, the hue resulting from a 100% combination of C, M, Y, and K values will not be the same as the hue resulting from a 50% combination of the C, M, Y, and K values. CMYK colorants do not scale linearly to make the same hue at different shades.

As a result, the color characterization module 220 creates a custom input characterization file that will determine which CMYK value matches each scaled value of the custom ink. For example, the color characterization module 220 may map the CMYK value for 80% of a specific custom ink color as 80% of the solid CMYK match, even though the actual device CMYK value may be different. The custom input characterization file created by the color characterization module 220 allows a customer to maintain the same workflow on a digital printer as was accomplished on the offset press. Namely, the customer is able to easily specify linearly scaled CMYK values of their custom ink color in the same manner they previously did on their offset printer.

Once a custom input characterization file is created by color characterization module 220, it is passed to hueing module 230. Hueing module 230 adds additional characterization data to the custom input characterization file to fill out the sparse regions in the color space. The additional characterization data added to the custom input characterization file helps to improve the color profile accuracy, and does not modify any of the existing color values mapped from the custom ink. In some embodiments, if the custom input characterization file already includes a wide variety and spectrum of input color hues, then hueing module 230 may not add any additional characterization data.

Once the custom input characterization file is processed by hueing module 230, it is passed to ICC profile module 240.

ICC profile module 240 operates to create a special input ICC file and output ICC files from the custom input and printer characterization file. These input and output ICC files are then passed to any digital printer responsible for the printing the jobs associated with the ICC files.

FIG. 3 is flow diagram illustrating one embodiment of a process 300 for color management workflow for transitioning offset printing using custom inks to digital printing. Process 300 may be performed by processing logic that may comprise hardware (e.g., circuitry, dedicated logic, programmable logic, microcode, etc.), software (such as instructions run on a processing device), or a combination thereof. In one embodiment, process 300 is performed by color image characterization device 200 described with respect to FIG. 2.

At processing block 310, spot color ramps (e.g., at 5, 10, 15 . . . 100% spread) for each custom ink color are printed on the offset press (or printer) used with the custom inks. Then, at block 320, each spot color ramp is measured using a color image recording device. In one embodiment, the color image recording device is a spectrophotometer. At block 330, CMYK matches are then found for each of the measured spot color samples. In one embodiment, the CMYK matches are printing device specific.

Based on the determined CMYK matches, a custom input characterization file is created at block 340. In one embodiment, the custom input characterization file contains the values of the originally measured L*a*b values for each custom ink color and their associated determined device CMYK values. As discussed above, the device CMYK values in the custom input characterization file are linear scaled.

Then, at block 350, additional characterization data for different hue angles is added to the custom input characterization file. In one embodiment, this additional characterization data is added to custom input characterization file with sparse input data associated with the custom ink. Lastly, at block 360, new input ICC and output ICC files are created from the custom input characterization file. These new ICC files are provided to any digital printer seeking to print the equivalent of the custom ink colors.

Figure 4:
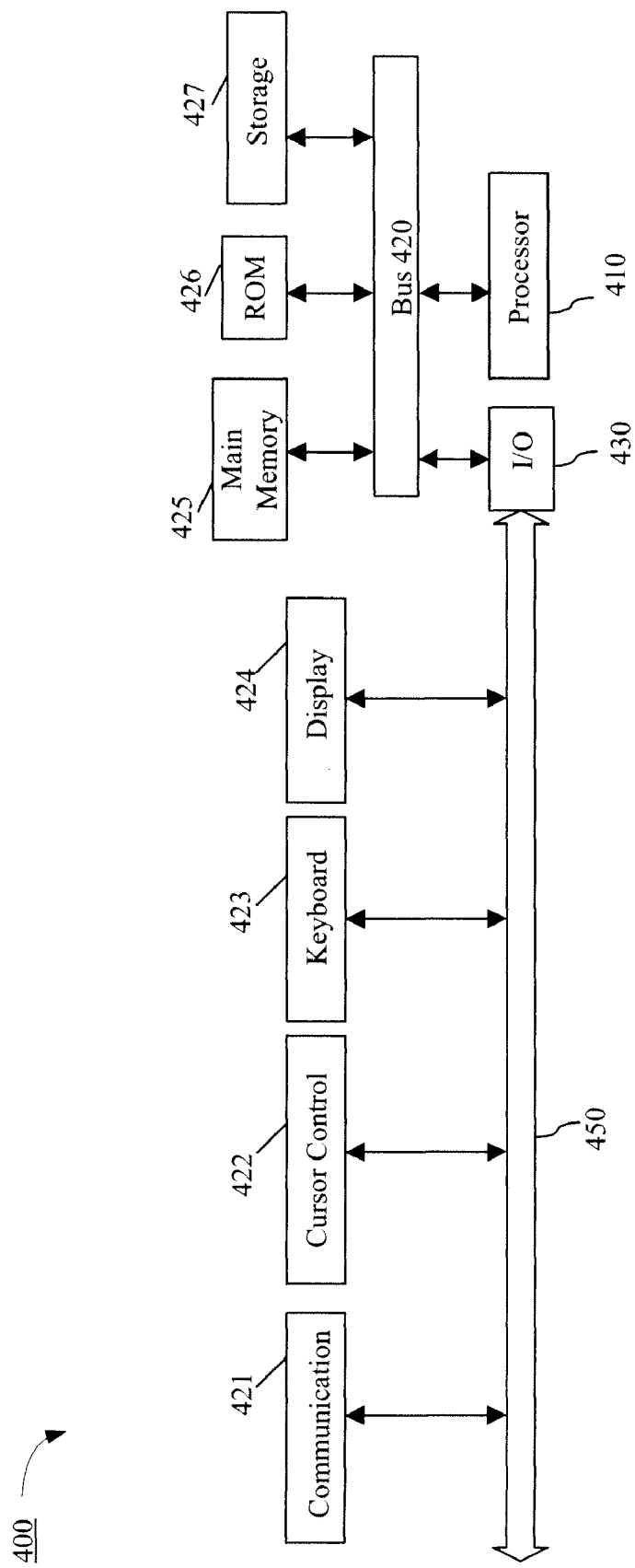
FIG. 4 illustrates one embodiment of a computer system.

FIG. 4 illustrates a computer system 400 on which color image characterization device 200 described with respect to FIG. 2 may be implemented. Computer system 400 includes a system bus 420 for communicating information, and a processor 410 coupled to bus 420 for processing information. According to one embodiment, processor 410 is implemented using one of the multitudes of ARM™ microprocessors. Nevertheless one of ordinary skill in the art will appreciate that other processors may be used.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients) via an external data network, for example. The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. An apparatus, comprising:
    a color image recording device to measure one or more spot color ramps that correspond to custom ink colors, the color image device operable to determine a matching L*a*b value for the spot color ramps;
    a color characterization module to determine device CMYK matches for each of the L*a*b values for the one or more spot color ramps, create a custom input characterization file based on the device CMYK matches and redefine the CMYK matches so that the redefined CMYK matches are the same as a linear scaling of the custom ink colors; and
    an International Color Consortium (ICC) profile module to create a new input ICC file and a new output ICC file from the custom input characterization file.

2. The apparatus of claim 1, further comprising a hueing module to add additional characterization data for different hue angles to the custom input characterization file.

3. The apparatus of claim 2, wherein the additional characterization data compliments a color profile of the custom input characterization file.

4. The apparatus of claim 1, wherein the color image recording device is a spectrophotometer.

5. The apparatus of claim 1, wherein redefining the CMYK matches includes mapping an actual value of the CMYK matches to a CMYK input that equals a linearly scaled percentage of the custom ink color.

6. The apparatus of claim 1, wherein the new input and output ICC files are provided to a digital printer to create one or more print jobs with colors analogous to the custom ink colors.

7. The apparatus of claim 1, wherein each spot color ramp includes a predetermined number of different percentage levels of the particular custom ink color and is printed at an offset press utilizing the custom ink color.

8. A method comprising:
    measuring one or more spot color ramps that correspond to custom ink colors, the color image device operable to determine a matching L*a*b value for the spot color ramps;
    determining device CMYK matches for each of the L*a*b values for the one or more spot color ramps;
    creating a custom input characterization file based on the device CMYK matches;
    redefining the CMYK matches so that the redefined CMYK matches are the same as a linear scaling of the custom ink colors; and
    generating a new input ICC file and a new output ICC file from the custom input characterization file.

9. The method of claim 8, further comprising adding additional characterization data for different hue angles to the custom input characterization file, wherein the additional characterization data compliments a color profile of the custom input characterization file.

10. The method of claim 8, wherein the color image recording device is a spectrophotometer.

11. The method of claim 8, wherein redefining the CMYK matches includes mapping an actual value of the CMYK matches to a CMYK input that equals a spread value of the custom ink color.

12. The method of claim 8, wherein the new input and output ICC files are provided to a digital printer to create one or more print jobs with colors analogous to the custom ink colors.

13. The method of claim 8, wherein each spot color ramp includes a predetermined number of different percentage levels of the particular custom ink color and is printed at an offset press utilizing the custom ink color.

14. An article of manufacture comprising a non-transitory machine-readable medium including data that, when accessed by a machine, cause the machine to perform operations comprising:
    measuring one or more spot color ramps that correspond to custom ink colors, the color image device operable to determine a matching L*a*b value for the spot color ramps;
    determining device CMYK matches for each of the L*a*b values for the one or more spot color ramps;
    creating a custom input characterization file based on the device CMYK matches;
    redefining the CMYK matches so that the redefined CMYK matches are the same as a linear scaling of the custom ink colors; and
    generating a new input ICC file and a new output ICC file from the custom input characterization file.

15. The article of manufacture of claim 14, wherein the machine-accessible medium includes data that causes the machine to perform further operations comprising adding additional characterization data for different hue angles to the custom input characterization file, wherein the additional characterization data compliments a color profile of the custom input characterization file.

16. The article of manufacture of claim 14, wherein redefining the CMYK matches includes mapping an actual value of the CMYK matches to a CMYK input that equals a percentage value of the custom ink color.

17. The article of manufacture of claim 14, wherein the new input and output ICC files are provided to a digital printer to create one or more print jobs with colors analogous to the custom ink colors.

* * * * *